July 31, 1956   F. C. DOBLE   2,756,587
TENSIOMETER
Filed Jan. 29, 1953
*Fig 1*
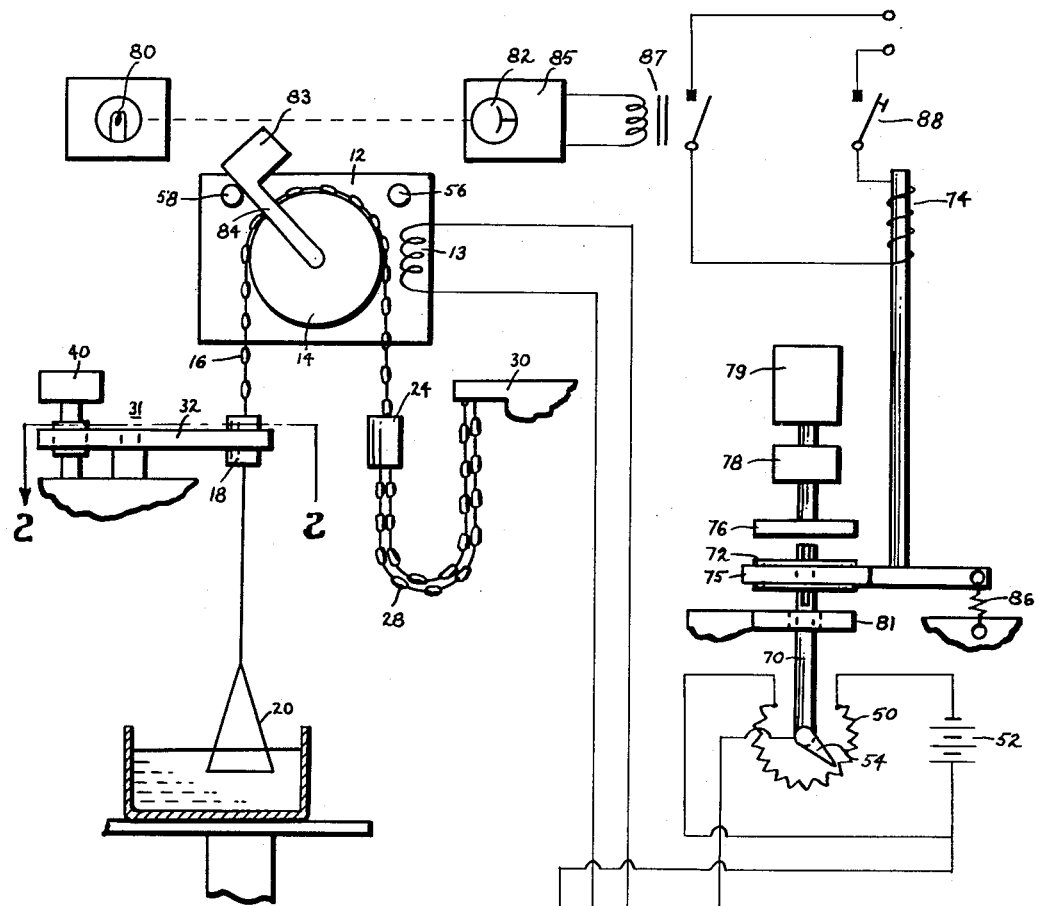
*Fig 2*
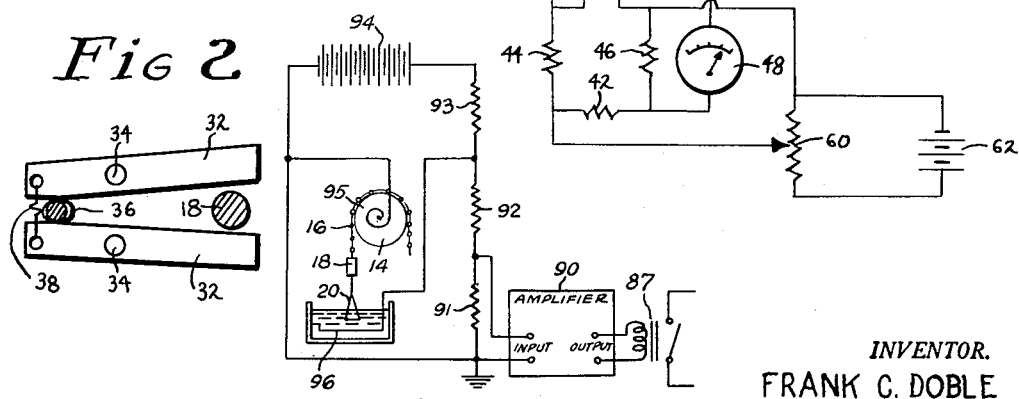
*Fig. 3*
INVENTOR.
FRANK C. DOBLE
BY
R W Furlong
ATTORNEY

United States Patent Office 2,756,587
Patented July 31, 1956

2,756,587

TENSIOMETER

Frank C. Doble, Cambridge, Mass., assignor to Doble Engineering Company, Belmont, Mass., a corporation of Massachusetts Application January 29, 1953, Serial No. 333,920

9 Claims. (Cl. 73—53)

This invention relates to means for measuring the surface or interfacial tensions of liquids, and more particularly to a novel liquid tensiometer of the ring type.

A liquid surface in contact with air or vapor behaves as if it were covered with a thin elastic membrane under tension and hence resists any increase in its surface area. The molecular force tending to oppose the increase in surface is called the surface tension of the liquid. Interfacial tensions are related to surface tension in that they are a measure of molecular attractive forces, but differ from true surface tension in that the attractive forces are between unlike substances. The attractive forces may be between two liquids, a liquid and a gas, or a liquid and a solid. Usually, interfacial tension measurements are made only at the interface of two quiescent liquids, for example, water and oil.

It is impossible to isolate a strip of the pseudo-elastic film and measure the force required to break or rupture the strip (which would be a measure of the surface tension of the liquid). An equivalent measurement can be made, however, by pulling an object such as a plate, ring, etc., of known dimensions through the surface by means of a force which is measured.

The most common method for determining surface or interfacial tension is to pull a ring vertically through the horizontal face with a slowly increasing force applied through a torsion balance.

Actually the ring draws the facial film up until portions of it are practically vertical in the form of cylinders which eventually are ruptured or broken.

The amount of force applied to the ring is indicated upon a scale which, when calibrated, gives readings of facial tensions in dynes per centimeter. The maximum force exerted by the ring on the face of the liquid just before the ring ruptures the facial film is taken as a measure of the surface tension or interfacial tension, as the case may be, of the liquid under measurement. The conventional spring-torsion balances used in the measure of surface or interfacial tensions, though reasonably satisfactory from the standpoint of accuracy, are difficult to operate in that they require repeated coordinated adjustments of two separate controls. Hence, if accurate and consistent readings are desired, an operator having a good deal of experience and skill in the use of such an instrument is required.

It is an object of the present invention to provide a tensiometer which does not require simultaneous coordinated adjustments of separate controls.

Another object is to provide a tensiometer of the plate or ring type which is substantially automatic in operation.

Another object is to provide a tensiometer of the plate or ring type for making measurements under automatically controlled and reproducible conditions.

Other and further objects will be apparent from the drawings and from the description which follows.

The foregoing objects are achieved by including an electro-mechanical converter of special design for drawing a plate or ring through the liquid face, together with means for controlling the force delivered by such converter and means for indicating the force.

For the purpose of explaining further objects and features of a preferred embodiment of my invention, reference is made to the attached drawings in which:

Fig. 1 is a schematic view of the liquid tensiometer of my invention;

Fig. 2 is a plan view of a portion of the tensiometer of Fig. 1; and

Fig. 3 is a schematic view of a portion of the apparatus showing another embodiment of my invention.

Referring to the drawings, the liquid tensiometer of my invention includes an electrical torque converter 12 adapted to apply an instantaneous force to the ring 20; for example, an electric meter movement of the D'Arsonval type having a moving coil 13, such as is commonly used in indicating instruments. The rotatable portion of said torque converter 12 has mounted thereon a drum or pulley 14 of constant radius, said drum having an extended flexible member 16 such as a fine chain, attached to its peripheral surface. On one side of the drum, the flexible member 16 extends freely downwardly to support a collet 18 in which is removably mounted a conventional tensiometer ring 20.

In order to provide static balance for the movable system in all of its positions, flexible member 16 extends freely downwardly from the other side of said drum and has attached thereto a balancing weight 24 sufficient to balance a desired percentage of the weight of collet 18 and ring 20. The static balancing means further includes a second flexible member 28, extending between the bottom of weight 24 and an arm 30 which is fixed to the frame of the apparatus and which serves to balance out the change in weight of flexible member 16 as it is wound up on and/or released from drum 14. The flexible member 28 has twice as much weight per unit length as does flexible chain 16; conveniently member 28 may be composed of a double portion of the chain. Although the above-described form of static balancing mechanism is preferred, any other suitable static balancing arrangement may be employed if desired.

To assist in the establishment of a complete static balance of the system without affecting the desired surface or interfacial measurement and to take care of the difference in weight of various rings, plates, etc. that may be used and which might require an accurate adjustment of the compensating weight 24, an initial torque is developed by means of current from an independent source 62. The initial torque current which is applied to the converter through an appropriate control circuit can be adjusted to cause the system to be in static balance in any rotative position of said drum. Then another force applied to the ring 20 by converter 12 for the purpose of moving the ring 20 through the liquid surface can be supplied by current from a separate source 52 so as to be indicated or measured on meter 48.

It will be noted that in order to accomplish the results just described, two sources of current are required. One supply of current comes from the source 62 which is used to produce sufficient torque to provide the static balance for the system. A second source 52 supplies the current to produce sufficient torque to move the ring through the surface and cause the rupture and to give the indication on meter 48. For the purpose of supplying current from either one of these sources to coil 13 independently and without affecting the other source I have provided a bridge circuit in which the resistance of converter coil 13 forms one arm. A resistor 42 forms the opposite arm and resistors 44 and 46 form the remaining two arms. By means of the bridge circuit made up of resistors 42, 44, 46 and coil 13 it is possible to supply current from source 62 through potentiometer 60 to establish the static balance as already described without recording on the meter 48. On the other hand, all current from source 52 supplied to draw ring 20 through the liquid face will be recorded on meter 48.

In order to provide means for removing the ring 20 for cleaning, collet 18 is of a type adapted to receive the upstanding vertical member at the top of said ring and releasably retain it by a sliding fit. A clamp 31 is provided for holding the collet when the ring 20 is in a fixed position, for inserting or removing the ring or when moving or storing the apparatus, the clamp including arms 32, 32 pivoted at 34 on the frame of the apparatus, said arms being operated by a cam 36 opposed by spring 38 at one end of said arm so that when said cam is rotated as by knob 40 the other end of said arms will close on and clamp collet 18 therebetween.

The circuit for supplying current from source 52 to coil 13 includes a milliammeter 48 for measuring the instantaneous current through said circuit and a potentiometer 50, said potentiometer 50 being connected across a suitable source of current such as battery 52 so that current through the circuit may be varied by rotation of potentiometer arm 54 connected to said circuit, the other side of said circuit being connected to one side of battery 52. Thus, rotation of potentiometer arm 54 will supply current to converter 12 to rotate drum 14 in a clockwise direction (as shown in Fig. 1) and wind up flexible member 16 thereon, thus moving the ring 20 through the liquid surface. When potentiometer arm 54 is rotated manually by the operator, rotation is stopped as soon as the ring ruptures the face of the liquid, the maximum current on meter 48 thus being a measure of the force required to draw the ring through the face of the liquid. The dial of meter 48 may conveniently be calibrated for a given system to read facial tension directly in dynes per centimeter.

After ring 20 ruptures the face of the liquid, the torque required to lift it will be reduced substantially to zero, and the torque converter will continue to rotate so long as current is supplied from source 52. In order to prevent damage to the instrument by excessive rotation of drum 14, limit stops 56 and 58 are provided against which arm 84 fixed on the shaft of torque converter 12 strikes, thus limiting the rotation of the torque converter.

In operation then, the ring 20 (after being suitably cleaned as by dipping it in alcohol and then flaming it as known to the art) is inserted in collet 18. Collet 18 is then released from the arms 32 by rotating knob 40. The level of the ring is then adjusted until it is at rest immediately below the liquid surface to be measured by adjusting potentiometer 60 with meter 48 set at a zero reading, and the system is then statically balanced. Potentiometer 50 is then rotated to supply current to coil 13 of converter 12 to rotate drum 14 clockwise, as shown in Fig. 1, to move ring 20 upward through the liquid surface. Increasing current is supplied to coil 13 by further adjustment of potentiometer 50 until the surface ruptures, the maximum instantaneous current just before the time of rupture being a measure of the surface or interfacial tension of the liquid face. Drum 14 continues to rotate until stopped by stop 56. Potentiometer 50 continues to supply the maximum current required to break the interface, the operator of the apparatus of course having stopped rotating the potentiometer 50 when the liquid surface ruptured. After the reading on meter 48 has been recorded, potentiometer 50 may be rotated to its zero position in readiness for a new reading.

I prefer to rotate potentiometer 50 by automatic means to improve the consistency of readings as well as to provide a substantially automatic apparatus. To this end I have provided a motor 79 to drive through an electrically operated clutch potentiometer shaft 70 (see Fig. 1) on said potentiometer arm 54. A disk 72 is mounted for sliding movement along a spline on shaft 70, the sliding movement of the disk being controlled by a solenoid 74 which moves disk-retaining ring 75 to move the disk 72 in one direction to contact a driving disk 76 driven through a suitable gear box 78 and motor 79 and in the other direction to contact a brake disk 81 surrounding potentiometer shaft 70 for stopping the driven disk 72, such brake disk 81 being desirable to prevent overrun of potentiometer 50. Driven disk 72 is normally retained in position against brake disk 81 as by a spring 86. The motor 79 is preferably arranged to continuously drive disk 76. The normal position of solenoid 74 presses driven disk 72 into contact with brake disk 81 so that potentiometer 50 will not be driven.

In order to control solenoid 74 to drive and stop potentiometer 50, I have provided a photo-electric means including lamp 80 and photocell 82. An indicator 83 for interrupting the beam between lamp 80 and photocell 82 is mounted on converter arm 84, said indicator 83 being arranged to interrupt said beam only after ring 20 has broken through the liquid surface. When the photocell circuit, including light source 80 and photocell 82 as well as other remaining components of a conventional photocell circuit generally indicated as 85 are in operating condition with the beam between light source 80 and photocell 82 uninterrupted, relay 87 is pulled in by said photocell circuit. If it is then desired to operate the motor drive to rotate potentiometer 50, standby switch 88 is then closed, to pull in solenoid 74 and drive driven disk 72 by driving disk 76. Standby switch 88 is preferably of the momentary type so that it is necessary to press it continuously in order to keep it closed. The potentiometer will then rotate and supply increasing current to torque converter 12 to move ring 20 upward through the liquid surface. Immediately after ring 20 ruptures the liquid surface, the torque being supplied by the converter can then act to turn drum 14 quickly to the position in which indicator 83 interrupts the beam from light source 80, causing photocell circuit 85 to open relay 87 and release solenoid 74 so that disk 72 contacts brake disk 81 and stops the rotation of potentiometer 50. Thus, as described above, meter 48 retains substantially the reading at which the surface ruptured, which can then be recorded by the operator. Standby switch 88 then may be released, the operator manually turns potentiometer 50 back to its initial position, to cancel the reading, the friction between disks 72 and 81 being low enough so that this may be easily accomplished. The apparatus is then in position to begin a new cycle.

In Fig. 3 an alternative arrangement is shown for controlling rotation of potentiometer 50, particularly adapted for use when the ring 20 is being drawn through the face of an electroconductive liquid, such as ordinary water, into air (or water vapor) or into a layer of nonconductive liquid such as oil. In this embodiment, relay 87, instead of being connected to photocell circuit 85, is connected to the output of an amplifier 90, the input of which is connected with suitable resistors 91, 92, 93 to a power source 94, which preferably supplies current at a potential of about 200 volts. One side of this power source 94 is also connected to drum 14 through a spiral wire 95 of negligible torque, thence through chain 16, collet 18, and ring 20 to the mass of water. The other side of power source 94 is connected through resistor 93 to electrode 96 immersed in the mass of water. The arrangement is such that the ring 20 is disposed in shunt across the input of the amplifier, the remainder of the apparatus being shown as in Fig. 1.

In operation, ring 20 is lowered until it is in the water layer, the switch controlled by relay 87 then being in the closed position, and standby switch 88 (Fig. 1) is closed to begin rotation of potentiometer 50. As soon as ring 20 breaks through the surface or interface of the water, as the case may be, its shunting effect across the input of amplifier 90 is removed, and the consequent change in potential across the input is sufficient to actuate relay 87 in the output circuit of the amplifier, thus interrupting the flow of current to solenoid 74 and permitting spring 86 to retract control arm 75 and brake the potentiometer against disk 81.

Although I have herein described specific embodiments of my invention, I do not intend to limit myself solely thereto but to include all of the obvious variations and modifications within the spirit and scope of the appended claims.

I claim:

1. A liquid tensiometer of the type having a liquid contacting member for measuring the pull of a liquid film including a rotatably mounted pulley, a flexible member attached to the peripheral surface of said pulley extending freely downwardly therefrom to support said contacting member, means for statically balancing said contacting and flexible members in all positions of rotation, and electrical means for rotating said pulley and for measuring the instantaneous force exerted on said contacting member.

2. A liquid tensiometer of the type having a liquid contacting member for measuring the pull of a liquid film, said tensiometer comprising a torque converter, a pulley rotatable with said torque converter and a flexible member attached to the peripheral surface of said pulley extending freely downwardly therefrom to support said liquid contacting member, means for statically balancing said flexible member and pulley in all positions of rotation, means for selectively supplying current to said torque converter to rotate said torque converter, and means for measuring the instantaneous current supplied to said torque converter, whereby the instantaneous value of the current supplied to said torque converter to rotate said pulley and wind up said flexible member thereon indicates the instantaneous force on said liquid contacting member.

3. A liquid tensiometer as claimed in claim 1, said static balancing means including mechanical means for balancing out the change in weight of said flexible member as it is wound up on said pulley to maintain said pulley in static balance as it is rotated.

4. A liquid tensiometer of the type having a liquid contacting ring for measuring the pull of a liquid film, said tensiometer including an electric torque converter having a coil, a drum of constant diameter rotatable with said torque converter, a flexible member attached to the peripheral surface of said drum extending freely downwardly therefrom to support said ring, means for statically balancing said flexible member and drum in all positions of rotation, means for selectively supplying current to said coil, and means for measuring the instantaneous current through said coil, whereby the instantaneous value of the current supplied to said coil to rotate said drum and wind up said flexible member thereon indicates the instantaneous force on said ring.

5. A liquid tensiometer of the type having a liquid contacting ring for measuring the pull of a liquid film, said tensiometer including an electric torque converter of the D'Arsonval type having a moving coil, a drum of constant diameter rotatable with said coil, a flexible member attached to the peripheral surface of said drum extending freely downwardly therefrom to support said ring, means for statically balancing said flexible member and drum in all positions of rotation, means for selectively supplying current to said moving coil to rotate said coil, and means for measuring the instantaneous current through said coil, whereby the instantaneous value of the current supplied to said coil to rotate said drum and wind up said flexible member thereon indicates the instantaneous force on said ring.

6. A liquid tensiometer as defined in claim 5 wherein the static balancing means includes a flexible member extending downwardly in a close loop from the side of the drum opposite the first said member with its free end secured in fixed position, at least the lower portion thereof having twice the weight per unit length as the first said member.

7. A liquid tensiometer as defined in claim 6 wherein said static balancing means further includes a supply of current to said coil independent of said first current supply means and of said measuring means.

8. A liquid tensiometer of the type having a liquid contacting member, said tensiometer comprising electromechanical converter means for supporting said member and drawing it through the face of said liquid, power supply means for supplying to said converter an amount of current barely sufficient to draw said member through said liquid face, means for measuring said current whereby to indicate the force applied to said member, and static balancing means for said converter including a supply of current to said converter independent of the first said power supply means and of said measuring means.

9. A liquid tensiometer comprising a liquid contacting member, torque converter means statically balanced in all positions of rotation for supporting said member and drawing it through the face of said liquid, means including a potentiometer for supplying current to said converter to draw said member through said liquid face, means for driving said potentiometer to increase the supply of current, means responsive to the movement of said member through said liquid face for stopping said potentiometer drive, and means for measuring the instantaneous current supplied through said potentiometer whereby to indicate the force applied to said member.

References Cited in the file of this patent

UNITED STATES PATENTS 1,960,224     Schoenberg _____ May 22, 1934

FOREIGN PATENTS 862,252     France _____ Nov. 30, 1940

OTHER REFERENCES

Bureau of Standards Journal of Research, vol. 12, 1934, pp. 175–177.